J. B. DENNIS.
ATTACHMENT FOR CHECK WRITERS.
APPLICATION FILED APR. 19, 1915.
1,161,817.
Patented Nov. 23, 1915.
3 SHEETS—SHEET 2.
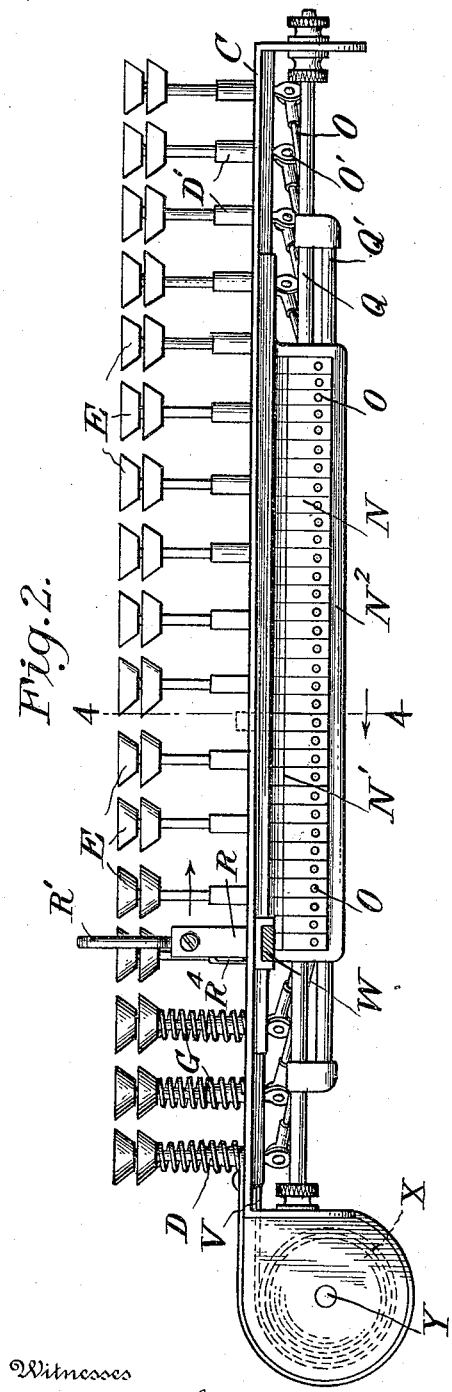
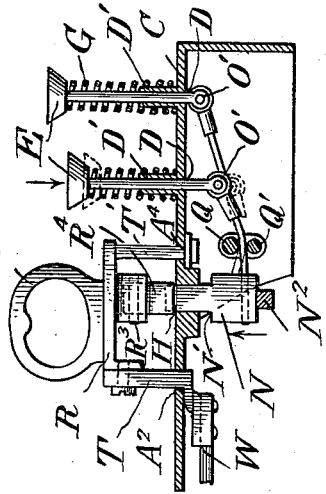
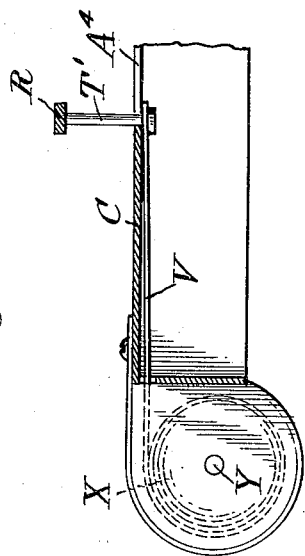
Inventor
John B. Dennis
By Franklin N. Hough
Attorney J. B. DENNIS.
ATTACHMENT FOR CHECK WRITERS.
APPLICATION FILED APR. 19, 1915.
1,161,817.
Patented Nov. 23, 1915.
3 SHEETS—SHEET 3.
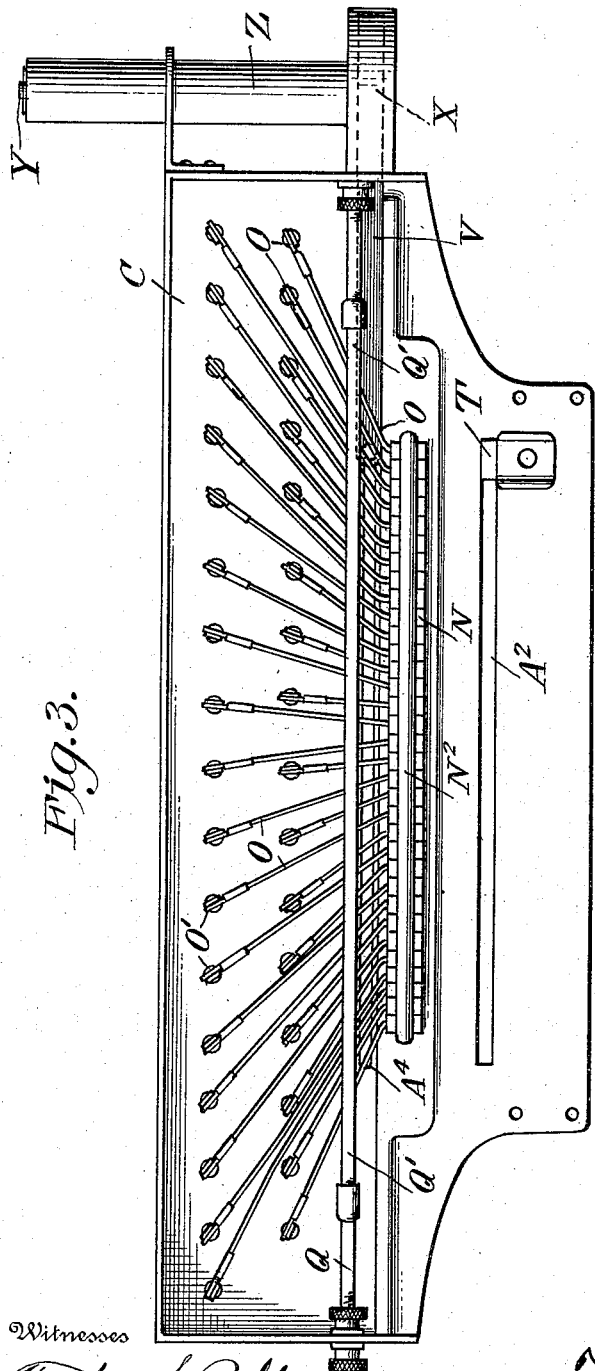
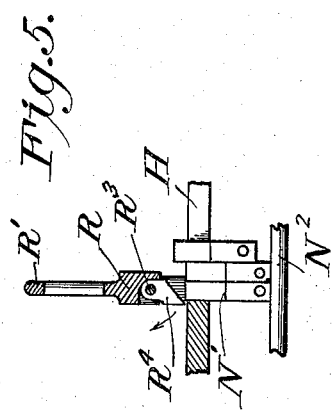
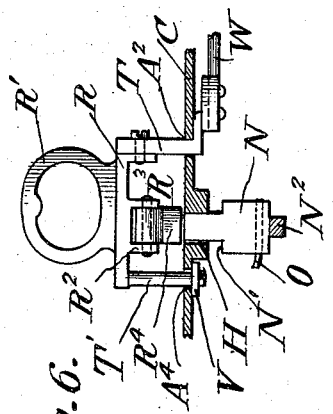
Inventor
John B. Dennis

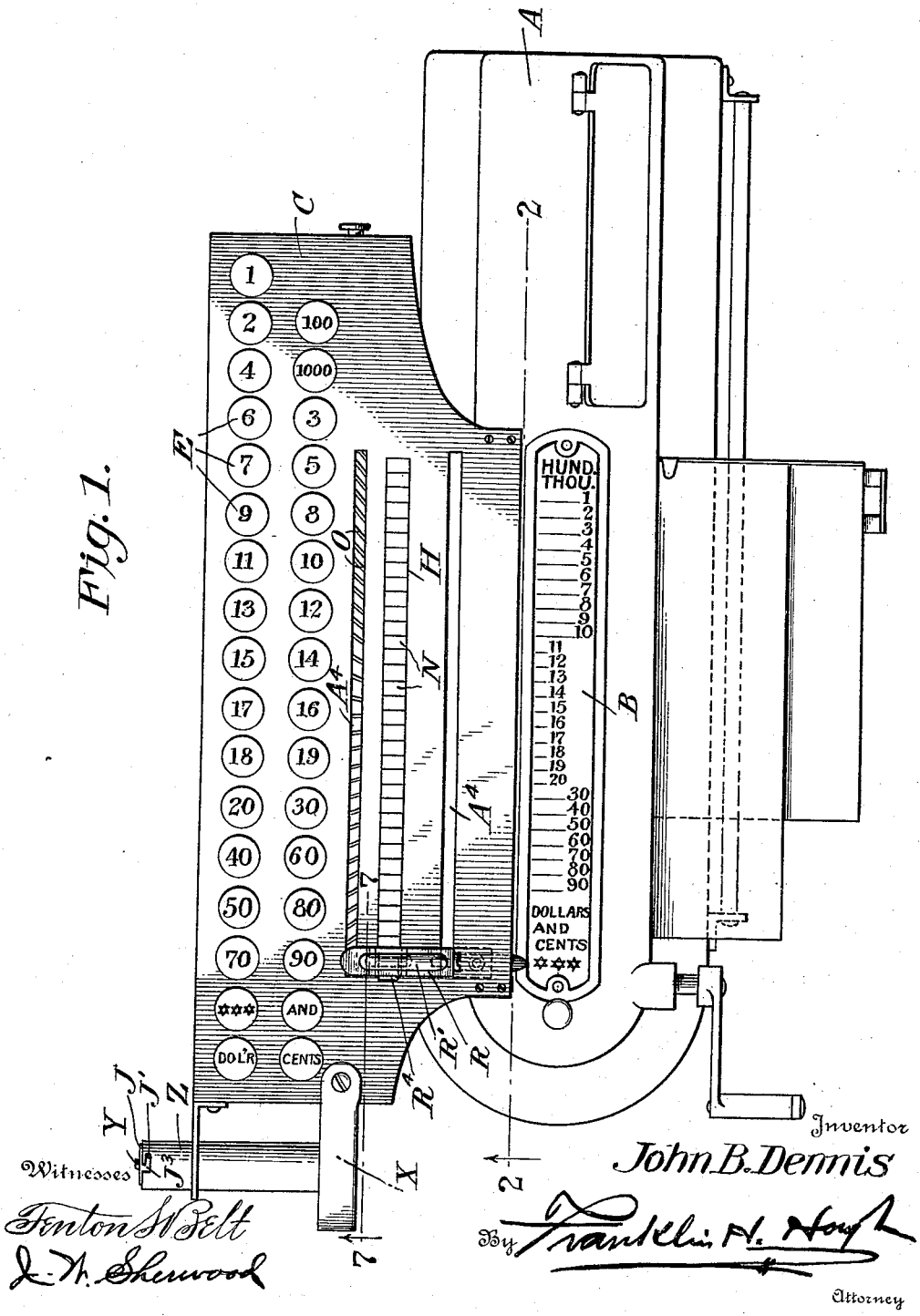

UNITED STATES PATENT OFFICE.

JOHN B. DENNIS, OF OTTUMWA, IOWA.

ATTACHMENT FOR CHECK-WRITERS.

1,161,817.

Specification of Letters Patent.   Patented Nov. 23, 1915.

Application filed April 19, 1915. Serial No. 22,509.

*To all whom it may concern:*

Be it known that I, JOHN B. DENNIS, a citizen of the United States, residing at Ottumwa, in the county of Wapello and State of Iowa, have invented certain new and useful Improvements in Attachments for Check-Writers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments for check writers and the object in view is to render more efficient apparatus of this nature, making the check writer absolutely accurate in its printing.

Heretofore in the operation of check writers, it was necessary for the operator to use exceeding care in moving the pointer opposite the exact line upon the scale indicating the word or character to be printed and any deviation from one side or the other of the line would necessitate an error in the printing, whereas, by the use of my attachment, all that is necessary for the operator to do is to depress a certain key, throw the pointer to actuate a stop lug and move a yoke carrying pawl beyond a stop lug and release the same, allowing certain spring mechanism to return the pawl solidly against the stop, which insures accurate printing of the word or character in the manipulation of the crank of the check writer.

The invention comprises a simple and efficient apparatus of this nature having various details of construction, combinations and arrangements of parts which will be hereinafter fully described, shown in the accompanying drawings and then specifically defined in the appended claims.

My invention is illustrated in the accompanying drawings, in which:

Figure 1 is a top plan view showing the application of the device to a check writer. Fig. 2 is a sectional view on line 2—2 of Fig. 1. Fig. 3 is a bottom plan view. Fig. 4 is a cross sectional view on line 4—4 of Fig. 2. Fig. 5 is a detail sectional view through the pivotal pawl. Fig. 6 is a detail in elevation of the side of the yoke opposite that shown in Fig. 4, and Fig. 7 is a sectional view on line 7—7 of Fig. 1.

Reference now being had to the details of drawings by letter, A designates the top of an ordinary check writer having the index plate B thereon, and C designates the frame of my attachment, which is held by means of screws and the resilient clamping arms to the frame of the check writer in the manner shown with its inner edge adjacent to the index plate. The frame C has a series of apertures D formed therein, and mounted in each aperture is a hollow boss D′, and E designate depressible keys mounted one in each of said bosses and each movable through an aperture in the frame C. A coiled spring G is mounted about each key and boss and bears intermediate a button on the key and the upper surface of the frame C.

The top of the frame C is provided with an elongated slot in which is mounted a series of stop lugs, each designated by letter N and each provided with a shoulder N′ adapted, by coming in contact with the under surface of the top of the frame C, to limit its upper throw. A rod $N^2$ is mounted on the under surface of the top of the frame and serves as a support for the various stop lugs. Each lug is apertured for the reception of a wire O which is pivotally connected at O′ to the bottom of one of said keys. Two parallel rods, designated by letters Q and Q′, are mounted underneath the top of the frame C and spaced apart and between which the said wires connecting the stop lugs and the keys pass, the said wires adapted to fulcrum against the wire Q′ when the keys are depressed and on the return movement of the keys, through the action of said springs, said wires fulcrum against the upper rod Q.

A yoke, designated by letter R, has a handle R′ thereon and a lug $R^2$ projects below the cross-piece and is recessed and provided for apertured walls for the reception of a pin $R^3$ upon which a pawl $R^4$ is pivoted, said pawl being adapted to swing freely in one direction, but prevented from swinging in the opposite direction by the rear wall of the recess against which the lug contacts. Said yoke has two arms, designated by letters T and T′, the former of which passes through and is movable within the elongated slot $A^2$ formed in the top of the frame, and is adapted to be fastened to the usual carriage W of the check writer, while the other arm of the yoke passes through a slot $A^4$ in the top of the frame C and is secured at one end to a metallic tape V which is adapted to wind about a spring-pressed reel X mounted upon the shaft Y which is journaled in the tubular shell Z, said spring being fastened to a plug J provided with a lug J' engaging a bayonet slot J³ and serving as a means for regulating the tension of the spring which actuates the reel to which the tape is fastened.

In operation, when it is desired to print a word or character, the operator depresses a particular key, throwing up a stop lug and, by taking hold of the handle upon the yoke, moves the same to the right, the yoke moving the carriage with it and, when the pawl contacts with the stop lug, will return idly over the same and, by releasing the handle, the spring-pressed tape will return the yoke until the pawl strikes the projecting stop lug which will arrest its further movement and which will set the check writing apparatus in proper position to print the word or character when the usual crank is turned. This operation is repeated for each character or word printed and thus dispensing with the necessity of accuracy in bringing the pointer to the exact position opposite the numeral or character upon the index plate of the usual check writer.

What I claim to be new is:—

1. An attachment for checkwriters comprising a frame adapted to be secured to a checkwriter, a yoke for attachment to the carriage of the checkwriter, a pawl carried by the yoke, a stop mechanism designed to be moved in the path of said pawl and over which the latter turns idly when the carriage is moved in one direction, and means for automatically returning the yoke until the pawl contacts with said stop in the path thereof.

2. An attachment for check writers comprising a frame for attachment to a check writer and provided with a series of depressible spring-actuated keys, stop lugs pivotally connected to the latter, a yoke for attachment to the carriage of the check writer, a pawl carried by the yoke and adapted to turn idly over one of said stop lugs which has been raised in the path of the same by a depression of the key as the yoke is moved in one direction, and means for automatically returning the yoke until the pawl contacts with a stop lug in the path thereof.

3. An attachment for check writers comprising a frame for attachment to a check writer and provided with a series of depressible spring-actuated keys, stop lugs pivotally connected to the later, a yoke for attachment to the carriage of a check writer, a pawl pivotally mounted upon said yoke and adapted to turn idly over a stop lug raised in the path of the same as the yoke is moved in one direction, and means for returning the yoke which is stopped by the pawl coming in contact with the upwardly projecting stop lug.

4. An attachment for check writers comprising a frame for attachment to a check writer and provided with a series of depressible spring-actuated keys, stop lugs pivotally connected to the latter, a yoke for attachment to the carriage of a check writer, a pawl pivotally mounted upon said yoke and adapted to turn idly over a stop lug raised in the path of the same as the yoke is moved in one direction, means for returning the yoke which is stopped by the pawl coming in contact with the upwardly projecting stop lug, and means for guiding the yoke in its movements.

5. An attachment for check writers comprising a frame for attachment to a check writer and provided with a series of depressible, spring-actuated keys, stop lugs pivotally connected to the latter, a yoke for attachment to the carriage of a check writer, a pawl pivotally mounted upon said yoke and adapted to turn idly over a stop lug raised in the path of the same as the yoke is moved in one direction, means for returning the yoke which is stopped by the pawl coming in contact with the upwardly projecting stop lug, the frame of the apparatus having slots through which parts of the yoke pass and serve as guiding means for the latter.

6. An attachment for check writers comprising a frame for attachment to a check writer and provided with a series of depressible, spring-actuated keys, stop lugs pivotally connected to the latter, a yoke for attachment to the carriage of a check writer, a pawl pivotally mounted upon said yoke and adapted to turn idly over a stop lug raised in the path of the same as the yoke is moved in one direction, and spring-actuated means for returning the yoke until the pawl thereon contacts with the upwardly projecting stop lug to limit the return movement of the yoke.

7. An attachment for check writers comprising a frame for attachment to a check writer and provided with a series of depressible, spring-actuated keys, stop lugs pivotally connected to the latter, a yoke for attachment to the carriage of a check writer, a pawl pivotally mounted upon said yoke and adapted to turn idly over a stop lug raised in the path of the same as the yoke is moved in one direction, a spring-actuated tape connected to said yoke and adapted to return the latter to a position determined by the pawl coming in contact with the upwardly projecting stop lug.

8. An attachment for check writers comprising a frame for attachment to a check writer and provided with slots, a series of spring-pressed keys mounted in apertures in the frame, a series of stop lugs with wires pivotally connecting the same to said keys, rods upon which said wires are fulcrumed, means for limiting the upper movements of said lugs, a movable, spring-pressed yoke mounted upon the frame, and a pawl carried thereby adapted to ride idly over said lugs when moved in one direction against which the pawl contacts to stop the movement of the lug on the return movement of the yoke.

9. An attachment for check writers comprising a frame for attachment to a check writer and provided with slots, a series of spring-pressed keys mounted in apertures in the frame, a series of stop lugs with wires pivotally connecting the same to said keys, rods upon which said wires are fulcrumed, said lugs having shoulders upon the sides thereof for engagement with the under surface of the top of the frame to limit their upper movements, a spring-pressed yoke, a pivotal pawl carried thereby adapted to ride idly over an upwardly projecting stop lug when the yoke is moved in one direction to contact with the same and arrest the return movement of the yoke when the latter is moving in the opposite direction.

10. An attachment for check writers comprising a frame for attachment to a check writer and provided with slots, a series of spring-pressed keys mounted in apertures in the frame, a series of stop lugs with wires pivotally connecting the same to said keys, rods upon which said wires are fulcrumed, said lugs having shoulders upon the sides thereof for engagement with the under surface of the top of the frame to limit their upper movements, a rod mounted underneath the frame and against which the lower ends of the lugs rest, a spring-pressed yoke, a pivotal pawl carried thereby adapted to ride idly over an upwardly projecting stop lug when the yoke is moved in one direction to contact with the same and arrest the return movement of the yoke when the latter is moving in the opposite direction.

In testimony whereof I hereunto affix my signature in presence of two witnesses.

JOHN B. DENNIS.

Witnesses:
J. A. WHITE,
C. A. ENGLISH.

Copies of this patent may be obtained for five cents each, by addressing the "Commissioner of Patents, Washington, D. C."